United States Patent [19]
Collins et al.

[11] Patent Number: 5,412,788
[45] Date of Patent: May 2, 1995

[54] MEMORY BANK MANAGEMENT AND ARBITRATION IN MULTIPROCESSOR COMPUTER SYSTEM

[75] Inventors: Hansel A. Collins, Clinton; David W. Hartwell, Boxboro, both of Mass.

[73] Assignee: Digital Equipment Corporation, Maynard, Mass.

[21] Appl. No.: 870,448

[22] Filed: Apr. 16, 1992

[51] Int. Cl.[6] .................. G06F 13/16; G06F 13/14
[52] U.S. Cl. ...................... 395/425; 395/325; 395/400; 395/725; 364/228.1; 364/228.3; 364/230; 364/242.91; 364/242.92; 364/243; 364/246.4; 364/DIG. 1
[58] Field of Search ............. 395/325, 725, 425, 575, 395/400; 364/242.91, DIG. 1, 228.1, 243, 246.4

[56] References Cited
U.S. PATENT DOCUMENTS

| | | | |
|---|---|---|---|
| 3,270,325 | 1/1963 | Meade et al. | 395/400 |
| 3,588,829 | 6/1971 | Boland et al. | 395/425 |
| 4,055,851 | 10/1977 | Jenkins et al. | 395/425 |
| 4,158,227 | 6/1979 | Baxter et al. | 395/425 |
| 4,195,342 | 3/1980 | Joyce et al. | 395/425 |
| 4,318,182 | 3/1982 | Bachman et al. | 395/650 |
| 4,669,056 | 5/1987 | Waldecker et al. | 395/325 |
| 4,747,070 | 5/1988 | Trottier et al. | 395/165 |
| 4,920,477 | 4/1990 | Colwell et al. | 395/425 |
| 4,937,733 | 6/1990 | Gillett, Jr. et al. | 395/325 |
| 4,974,205 | 11/1990 | Kotani | 365/162 |
| 5,068,781 | 11/1991 | Gillett, Jr. et al. | 395/325 |
| 5,185,877 | 2/1993 | Bissett et al. | 395/425 |
| 5,226,134 | 7/1993 | Aldereguia et al. | 395/425 |

Primary Examiner—Glenn Gossage
Assistant Examiner—Reginald Bragdon
Attorney, Agent, or Firm—Arthur W. Fisher; Denis G. Maloney; Mark J. Casey

[57] ABSTRACT

A memory management and arbitration technique that reduces system bus contention by eliminating memory bank conflicts employs a restrictive, distributive memory-arbitration scheme, and an improved address decoder for decoding addresses of software reconfigurable memory. In the memory-arbitration scheme, each commander node desiring access to a particular memory bank first determines whether that memory bank is "available" before initiating access to that memory bank, with the determination being made before requesting control of the system bus. A memory bank is "available" if it was not accessed during a predetermined number (e.g., two) of the immediately previously-occurring arbitrations for the system bus. The address decoder includes a mapping register that stores information concerning the addresses assigned to, and the structure of, the memory module. The address decoder also has an address/range decoder section, an interleaved decoder section, and a bank decoder section. The address/range and interleave decoder sections determine the memory module containing the address being decoded. This can be combined with the output of the bank decoder section to identify the particular memory bank on the system bus that contains the address.

8 Claims, 9 Drawing Sheets

MEMORY BANK MANAGEMENT AND ARBITRATION IN MULTIPROCESSOR COMPUTER SYSTEM

CROSS REFERENCE TO RELATED APPLICATION

This invention is related to commonly assigned U.S. patent application, Ser. No. 07/870,436, abandoned in favor of the continuation application with Ser. No. 08/110,634, now abandoned in favor of the continuation application with Ser. No. 08/248,032, entitled "Dynamic Arbitration for System Bus Control in Multiprocessor Computer System," and filed on even date herewith. The disclosure of that application is incorporated herein by reference.

FIELD OF THE INVENTION

This invention relates generally to a digital computer having multiple devices interconnected by a system bus over which the devices communicate among themselves. More specifically, the invention pertains to techniques for reducing system bus contention by reducing or even eliminating memory bank conflicts, thereby assuring access to memory resources while minimizing memory access times.

BACKGROUND OF THE INVENTION

A. Multiprocessor Computer

Typically, a multiprocessor computer has a number of devices, including multiple (i.e., two or more) processors, interconnected by a system bus for communication. The devices on the system bus can also include one or more memory modules and one or more input/output (I/O) units, such as disk, tape or I/O bridge controllers. Each memory module includes at least one memory bank. A memory bank is an independently accessable memory unit, such as a dynamic random access memory ("DRAM") and associated support logic.

All of the devices occupy what are known as "slots" on the system bus. A "slot" is the physical location of the interconnection for the device on the bus. Each slot on the system bus has an associated identifier, called a "SLOT ID." The number of slots determines the maximum number of devices that can be connected to the system bus.

Essentially, the memory banks on the system bus serve as shared resources for the processors and I/O units, and therefore can be called "resource nodes." The processors and I/O units can be called "commander nodes." The commander nodes initiate requests to gain control of the system bus to access the resource nodes. Upon gaining control of the system bus, the commander nodes transmit commands (e.g., read or write) over the system bus, to which the resource nodes respond.

In a known computer, the commander nodes transmit the requests and commands in synchronization with system bus cycles. The bus cycles specify periodically occurring intervals of time during which requests, commands, and data can be transmitted over the system bus. During the system bus cycles, the times when requests can be transmitted are called "request cycles." Each commander node "desiring" bus access transmits a request during one of the request cycles, typically during the next-occurring request cycle.

B. Arbitration Mechanisms

When two or more commander nodes request control of the system bus during the same request cycle, the computer employs bus arbitration to determine which of the requesting commander nodes is to gain bus control. Control is granted to or taken by the requesting commander node that wins the arbitration.

In known bus arbitration techniques, each node capable of requesting system bus access typically is assigned a priority level. An arbitration mechanism compares the priority levels of all devices that request control of the system bus during the same request cycle, and the device with the highest priority among those gains control of the bus.

Computers use either central or distributed arbitration mechanisms. In central arbitration, a single, central priority device, frequently called an "arbiter," receives all access requests during each request cycle, determines which of the requesting nodes has the highest priority, and grants that node bus access. By contrast, in distributed arbitration, each requesting node determines for itself whether it has won arbitration, i.e., whether it has sufficient priority to obtain control of the system bus. There is no central arbiter. If another node of higher priority simultaneously seeks bus access, the other node will win the arbitration, and the requesting node(s) of lower priority must wait until the next request cycle to again seek bus access by transmitting another request.

C. System BUS Transactions

A "transaction" can be defined generally as a complete logical task being performed via the system bus, entailing one or more transfers of information between nodes. Once a commander node has arbitrated for the system bus and won, it issues a command/address transfer to initiate a transaction. The "command" portion or transfer of the command/address transfer specifies the type of transaction to be performed, and the "address" portion or transfer thereof identifies the memory locations involved in the transaction. In response to the command/address transfer, data is normally sent over the system bus.

For example, a "read" transaction consists of one or more data transfers from a resource node, e.g., a memory bank, to a commander node, which follow a command/address transfer identifying the memory locations from which the data is to be retrieved. Analogously, a "write" transaction consists of one or more data transfers from a commander node to a memory bank, which follows a command/address transfer identifying the memory locations into which the transferred data is to be written.

D. Memory Bank Conflicts

Memory bank conflicts occur when two or more commander nodes request access to data stored within the same physical bank of the memory in overlapping transactions. In other words, memory bank conflicts occur when, during a first transaction involving an access request to that bank from a first commander node, a second commander node initiates a transaction to that bank. When memory bank conflicts occur, the memory bank is unable to respond in a timely way to the requesting commander nodes, whereupon system efficiency is decreased.

Various methods have also been proposed for reducing memory bank conflicts. These include, for instance, memory/slave queue structures and highly interleaved memory structures.

In a known memory/slave queue structure, in response to a command/address transfer identifying it as the memory bank being accessed (e.g., for a read transaction), the identified memory bank normally arbitrates for the system bus, and, on winning, transfers the requested data. If the memory bank can not service the "read" request when it is received, the memory bank stores the command/address information in a transaction queue buffer until the request can be serviced. Regardless of whether they must be placed in the transaction queue, the command/address transfers are typically serviced on a "first-in-first-out" basis.

If the transaction queue becomes too long, however, the transaction queue buffer can be in danger of overflowing (i.e., exceeding the storage size of the buffer), which may result in loss of stored command/address information. Consequently, in many such systems, when the transaction queue reaches a preselected length, the memory can assert an INHIBIT line or signal to prevent any of the commander nodes from issuing further access requests (i.e., command/address transfers) on the system bus. With this scheme, while the INHIBIT line is asserted, no further bus transactions are permitted, even to other memory banks that have transaction queues not in danger of overflowing. Accordingly, the throughput of the entire system can drop to zero when the INHIBIT line is asserted by any memory bank, even if other memory banks can accommodate further transactions.

In a variation on this approach, the memory bank with the lengthy transaction queue can return a "retry" response instead of asserting an INHIBIT line. A "retry" response instructs the commander nodes to retry access requests at later times. Of course, even at the later times, the requesting commander nodes may still encounter "retry" responses; consequently, this approach can significantly increase traffic on the system bus while not facilitating access to the memory resources.

The other mentioned approach, "interleaving," is the process of dividing a memory space into a series of memory units or banks, and assigning logical addresses so that adjacent sequential addresses of the memory space correspond to memory locations in different banks. For example, with four-way or (i.e., four level) interleaving, the memory space is divided into four banks: Bank No. 1 contains datawords (i.e., the minimum addressable quantities of stored dam) assigned addresses 1, 5, 9, 13, etc., bank No. 2 contains datawords assigned addresses 2, 6, 10, 14, and so forth.

For accessing data located at a series of sequential addresses, the interleaving permits the memory to operate in an overlapping fashion to provide the data four times as fast as a non-interleaved memory could do. Two-way interleaving reduces the probability of a memory conflict by 50% (i.e., by 1/M, where "M" is the number of ways the memory is interleaved).

A drawback with conventional interleaving schemes is that they do not "resolve" memory bank conflicts that do arise. With the sizes of DRAM's increasing significantly with each new generation of computers, the probability of memory bank conflicts can be significant, even with highly interleaved memories.

Another source of memory conflicts can be masked write operations. A masked write operation, which is sometimes referred to as a "read-modify-write" (RMW), consists of a read operation followed by a write operation. The read operation obtains the requisite byte transfer size of data from the memory, including the data from the locations to which data is to written. The commander node then over-writes the bytes that occupy those data locations, and the previously read data, with the modified bytes, are then written back to memory during the write portion of the operation.

If a masked write operation is not "atomic," another commander node can concurrently read data from or write data to the same memory locations involved in the masked write operation. In that case, the data being processed by one or the other commander nodes, or being written to memory, may be not correct or not current, i.e., in short, "dirty." Unpredictable results affecting system integrity can occur when this happens.

A known technique for providing atomic transactions to avoid such memory bank conflicts involves an exclusive access command, such as an "interlock read" command. This technique uses a "lock" indicator or bit in a memory bank, which is set when the "read" portion of a masked write operation is performed and which is reset after the "write" portion is completed. In response to an attempted read or write operation by another commander node to the same memory locations after the lock bit is set, the memory returns lock status information to that commander node to indicate that the second read command was not accepted by the memory. A system including a memory lock indicator is described in U.S. Pat. No. 4,937,733.

The interlock read operation alleviates problems caused by multiple processors attempting to perform conflicting operations; however, commander nodes may repeatedly encounter locked memory locations and thus may not be able to obtain needed access to memory resources in a timely manner.

SUMMARY OF THE INVENTION

The invention resides in a memory management and arbitration technique that reduces system bus contention by eliminating memory bank conflicts through the use of a restrictive, distributive memory-arbitration scheme, and through the use of an improved address decoder logic for decoding addresses of software reconfigurable memory.

In the memory-arbitration scheme, each commander node desiring access to a particular memory bank first determines whether that memory bank is "available" before initiating access to that memory bank, with the determination being made as before requesting control of the system bus. A memory bank is "available" if it was not accessed during a predetermined number (e.g., two) of the immediately previously-occurring arbitrations on the system bus.

Each commander node determines memory bank availability by comparing a bank identifier ("ID") for that memory bank with the memory bank ID's involved in the predetermined number of prior bus arbitrations. More specifically, each commander node monitors the system bus, uses the above-mentioned improved address decoder logic to decode command/address transfers received over the bus, stores the decoded memory bank ID for the memory banks involved in the prior, e.g., two, transactions, and compares these with the bank ID of the particular memory bank to which the commander node desires access. If neither of the stored bank ID's match, that particular memory bank is available.

If that memory bank is found to be available, then the commander node next arbitrates for control of the system bus, and, on winning the arbitration, initiates access to that memory bank. On the other hand, if that memory bank is found to be not available, the commander node waits until that memory bank is next available before arbitrating for control of the system bus and making a request thereto.

Preferably, the memory of the computer is software reconfigurable for maximum interleaving. For purposes of addressing, the memory modules are "stacked" into equal size structures (e.g., of 128 megabytes, 256 megabytes, etc., where each byte consists, e.g., of eight bits) to the extent possible. This is significant in that it permits interleaving among memory modules having different sizes. After the modules are stacked, the datawords contained in the stack structures are assigned interleaved addresses.

In accordance with another aspect of the invention, each memory module and commander node includes an address decoder arrangement for decoding addresses that have been interleaved, e.g., pursuant to the just-described stacking/interleaving scheme. The address decoder arrangement of each memory module includes a single address decoder for decoding command/address transfers received over the system bus. The address decoder arrangement of each commander node includes separate address decoders, one corresponding to each slot on the system bus to which a memory module can be connected. They are used for decoding command/address transfers received over the system bus and for decoding addresses of transfers to be made over the system bus by the commander node itself.

Each address decoder has a mapping register that stores information concerning the addresses assigned to, and the structure of, the memory module. The information preferably includes the starting address, address range and width, number of banks included in the module, number of modules interleaved in the applicable memory structure, and level of interleaving.

The address decoder also has an address/range decoder section (i.e., a "Y" decoder"), an interleave decoder section (i.e., an "X" decoder), and a bank decoder section (i.e., a "Z" decoder). The address/range decoder section determines the starting address and the range of addresses to which a transfer pertains. The interleave decoder section determines the particular interleaved address within that address range. The address decoder combines the outputs from the address/range and interleave decoder sections to produce a MODULE SELECT signal, which indicates the memory module containing the address being decoded.

The bank decoder section determines the memory bank containing the address being decoded, but not the identity of the module containing that memory bank. The output of the bank decoder is a BANK SELECT signal.

Each memory module uses the MODULE SELECT signal to determine individually whether each command/address transfer over the system bus involves memory addresses assigned to it. In addition to determining that a command/address transfer "belongs" to it, each memory module uses the BANK SELECT signal to select the one of its memory banks containing the addresses specified by that transfer.

Moreover, the address decoders of the commander nodes combine the MODULE SELECT signal with the BANK SELECT signal to produce a BANK ID signal that uniquely identifies the particular memory bank within the particular module that contains the address being decoded. In other words, the BANK ID signal specifies the unique bank ID on the system bus for the bank containing that address. Each commander node uses the BANK ID signal to track prior memory bus accesses for purposes of implementing the restrictive memory arbitration scheme that was described above, as well as a restrictive I/O interface arbitration scheme, which is the subject of the above-identified, related application.

The address decoder provided by the invention obtains the bank ID using fewer address bits than in known address decoders employed in systems having interleaved memories. As a result, the invention provides fast decoding of the address information of system bus transfers. Moreover, the invention accomplishes a reduction in memory conflicts, and this facilitated address decoding, while imposing no significant restrictions on memory module installation in the computer system.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS a. The Multiprocessor Computer System 10

Figure 1:
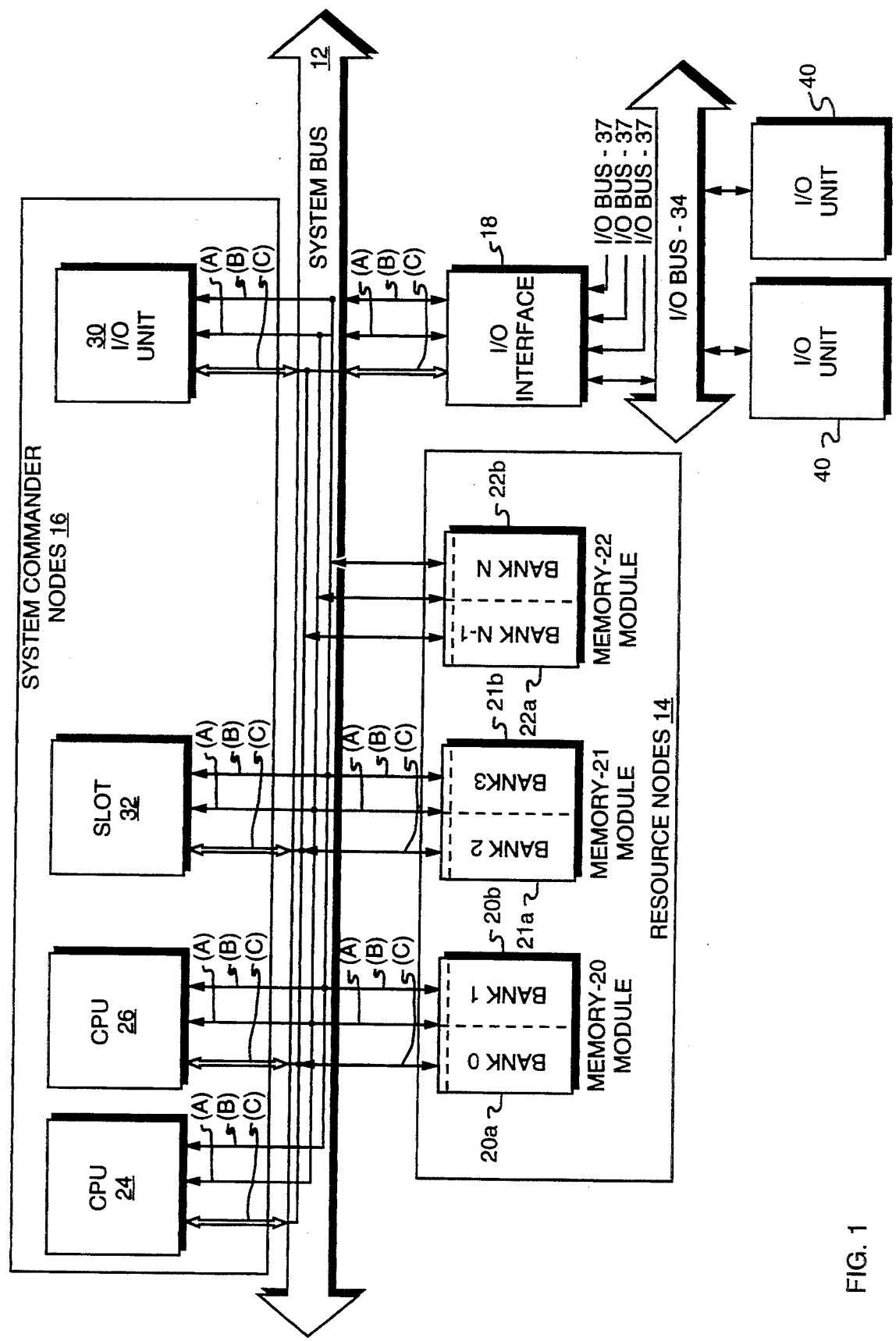
FIG. 1 is a block diagram of a multiprocessor computer system employing dynamic arbitration for system bus control, in accordance with the invention.

FIG. 1 shows a multiprocessor computer system 10 adapted for dynamic arbitration in accordance with a preferred embodiment of the invention. The computer system 10 has a system bus 12 for directly interconnecting one or more resource nodes 14, a plurality of system commander nodes 16, and an I/O interface 18. The resource nodes 14 can include, e.g., memory modules 20-22.

Each memory module 20-22 has first and second, independently accessible memory banks 20a, 20b, 21a, 21b, 22a, 22b. Other embodiments of the invention can employ a larger number of memory banks in each module, or, for that matter, a single bank in each module.

Figure 4A:
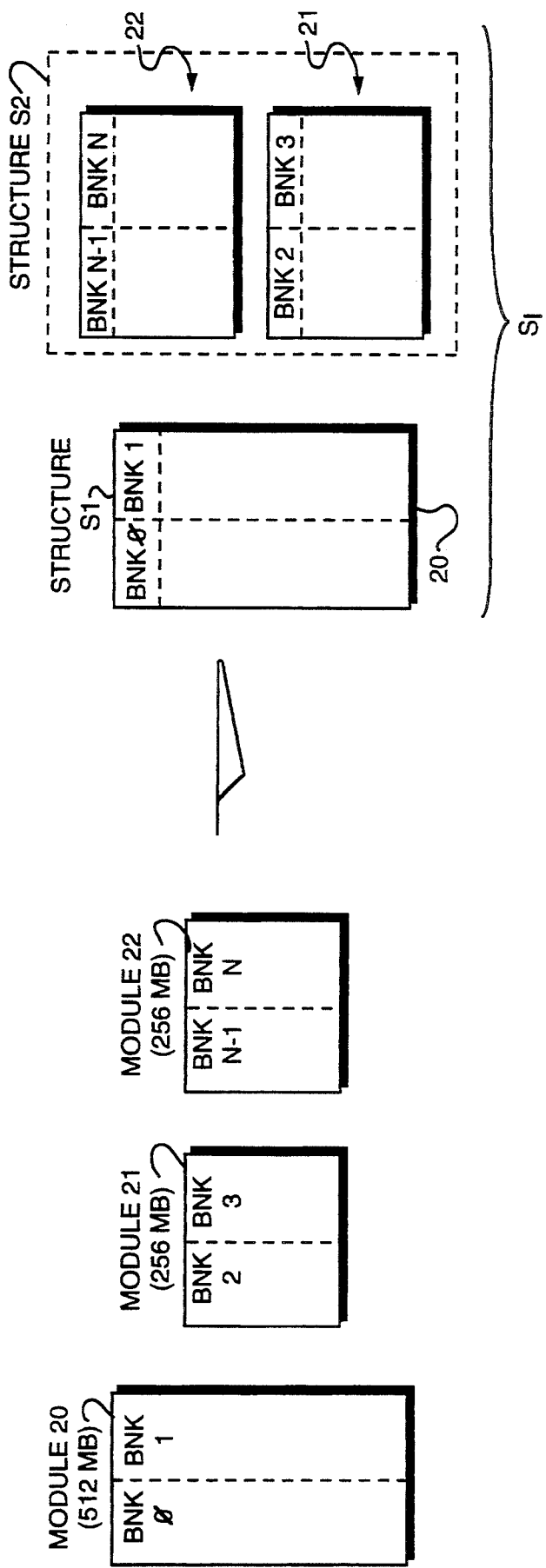
FIG. 4A is an illustration of a preferred stacking/interleaving scheme for the memory modules of FIG. 1.

Preferably, the memory modules 20-22 are software reconfigurable for maximum interleaving regardless of the storage sizes of the modules 20-22. For purposes of addressing, the memory modules 20–22 are stacked by software into equal-size stacks or structures, to the extent possible. For example, and as illustrated in FIG. 4A, memory module 20 has 512 megabytes of storage capacity, and memory modules 21, 22 each have 256 megabytes of storage capacity. Memory module 20 can be deemed for addressing purposes to form a first structure S1 of 512 megabytes, and modules 21, 22 can be stacked to form a second structure S2 of an equal size to that of structure S1.

After modules are stacked, the datawords contained in the stack structures are assigned interleaved addresses; more particularly, the addresses of memory banks of structures of the same size are interleaved together to form an interleaved memory space $S_I$. That is, sequentially adjacent addressed datawords alternate between structure S1 and S2 in interleaved memory space $S_I$. Preferably, interleaving of stacks comprising two or four memory modules of the same configuration and capacity can be carried out. With two banks per memory module, this means that 2, 4, or 8 memory banks can be interleaved together.

Thus, in the example of FIG. 4A, where each dataword is 64 bytes long, the structures S1, S2 are four-way interleaved (i.e., interleaving of two banks per module, two modules): Even-numbered-addressed datawords 0, 2, 4, 6, etc. are contained in structure S1 and physically in module 20, and odd-numbered-addressed datawords 1, 3, 5, 7, etc. in structure S2 that physically is module 21 and module 22. (The actual physical memory module in which the odd-numbered-addressed datawords reside is dependent on the address ranges of the modules. For instance, odd-numbered-addressed datawords with memory addresses greater than 512 megabytes reside in module 22, and those with memory addresses less than 512 megabytes are in module 21.)

This interleaving approach minimizes memory access time of back-to-back transactions to contiguous memory "blocks" by placing these contiguous memory blocks in different memory modules 20–22 and/or banks 20a–22b.

If an additional memory module (not shown) of 128 megabyte capacity were added to the computer 10, it could not be interleaved with memory modules 20–22 since that added module could not form a structure of the same size, i.e., 512 megabytes, as structure S1, S2. If, in addition to that module, two 64-megabyte modules (not shown) were added, these three added modules could be stacked into two structures of 128 megabytes each, which can then be interleaved together using four-way interleaving to form another interleaved memory space. These two 128-megabyte structures, however, could not be interleaved with the 512-megabyte structures S1 and S2 because of the size difference.

Aspects of the invention can be practiced with stacking/interleaving schemes other than the one just described, as will be apparent to those in the art.

The system 10 can accommodate up to, e.g., four system commander nodes 16, and even more commander nodes 16 can be added in other implementations of the invention. In the illustrated configuration, the system 10 has two central processing units (CPU's) 24, 26, an I/O unit 30, and an empty system-commander-node slot, which is shown in phantom at 32, for accommodating another CPU or another I/O unit. The system 10 can be adapted and configured in accordance with the principles of the invention to accommodate a larger or different number of CPU's and I/O units as system commander nodes 16, depending on the particular application.

The I/O bus interface 18 connects the system bus 12 to a number, e.g., four I/O buses 34–37. Connected to each I/O bus 34 is one or more I/O units 40. The I/O interface 18 arbitrates on behalf of the I/O units 40 for control of the system bus 12, and performs any required translation and housekeeping functions for transfers between the I/O buses 34–37 and the system bus 12. The I/O units 30, 40 can include, e.g., disk or tape controllers. Depending once again on the application, the system 10 can be configured to accommodate any number of I/O buses, but, preferably contains only a single I/O interface 18 regardless of the number of I/O buses to be connected.

b. The System Bus Structure and Transactions

Figure 2:
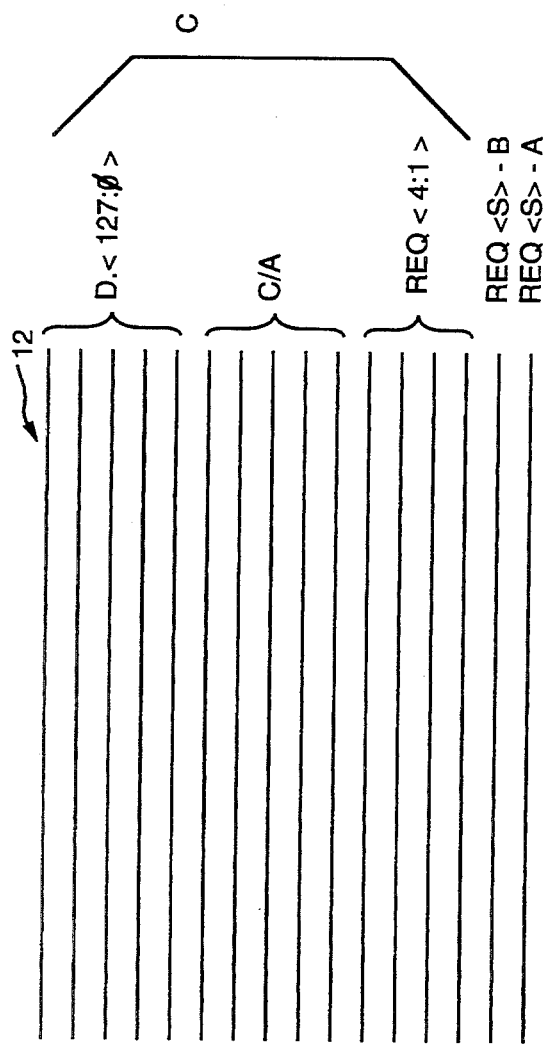
FIG. 2 is an illustration of certain relevant conductors of the system bus of FIG. 1.

With additional reference to FIG. 2, the system bus 12 is shown as including 128 conductors (also called "lines") D<127:0> for carrying data; a sufficient number of conductors or lines C/A to address all available memory and transmit all available commands, for carrying command/address information; and six conductor or lines REQ<5:0> for carrying bus requests from commander nodes 16, 18. ("REQ<5:0>" is read "request lines 0 to 5.") The system bus 12 can also have other conventional conductors or lines, such as, e.g., reset and stall conductors, which need not be described herein.

Each bus request conductor REQ<5:0> corresponds to a specific priority level that is used by a particular commander node 16, 18 in arbitrating for access to the system bus 12. For example, REQ<5> corresponds to the highest arbitration priority level, and REQ<0> corresponds to the lowest priority level, and the remaining request lines correspond to intermediate priority levels. When asserting a request on the associated request lines, a commander node drives a corresponding line, e.g., to a high voltage level, i.e., a DIGITAL HIGH to communicate both its request for the system bus 12 and its corresponding priority level.

For convenience in designation of the system bus conductors in FIG. 1 and the accompanying description, REQ<0> bears reference letter "A," REQ<5> bears reference letter "B," and the data lines, C/A lines and REQ<4:1> are denoted "C."

Figure 3:
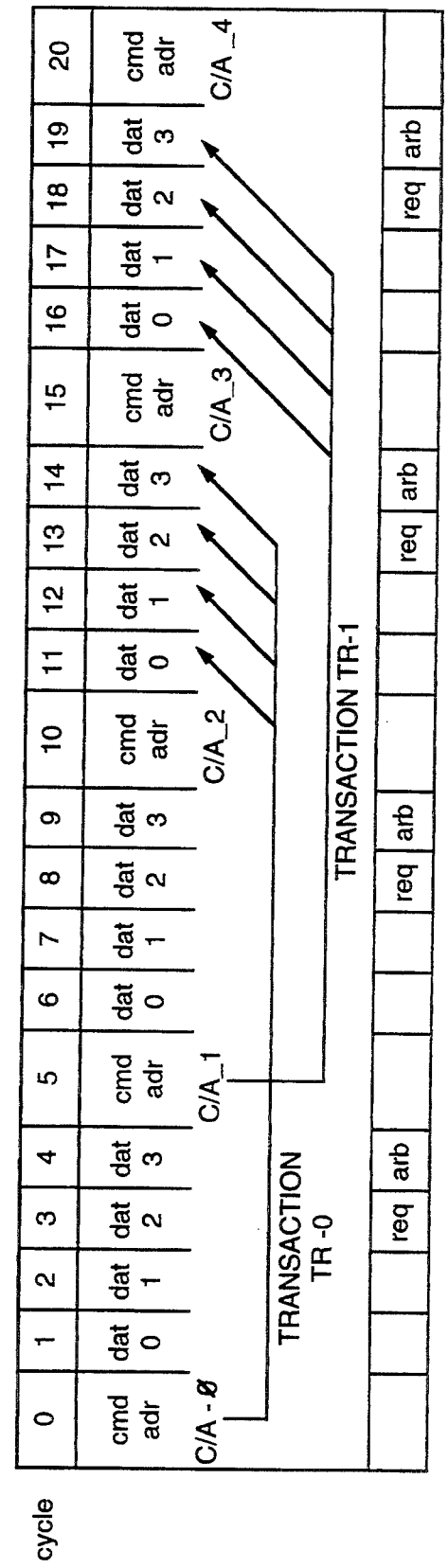
FIG. 3 is a timing diagram for selected signals on the system bus of FIG. 1.

FIG. 3 depicts the bus cycles (numbered at the top of the drawing) for the system bus 12, and the relationship of certain bus transfers relevant to the invention. Each bus cycle has, e.g., a 17-nanosecond duration. As shown, the system bus 12 carries a number of transactions TR_0, TR_1, etc. Each transaction TR_0, TR_1 on the system bus 12 has a single command/address transfer occurring during a command/address cycle and a number, e.g., four, of corresponding data transfers occurring during data cycles DAT_0 through DAT_3.

"Transaction" can be defined generally as a complete logical task being performed via the system bus, entailing one or more transfers of information between nodes. The command portion of the command/address transfer preceding the transaction specifies the type of transaction to be performed, and the address portion identifies the memory locations involved.

For example, a "read" transaction consists of one or more data transfers from a resource node to a commander node that follow a command/address transfer identifying the memory locations to be read. Analogously, a "write" transaction consists of one or more data transfers from a commander node to a resource node that follows a command/address transfer identifying the memory locations into which the transferred data is to be written.

It should be observed that the system bus can "pipeline" transactions. A pipelined transaction is one that is initiated prior to a previous one's completion. In other words, bus transactions are interleaved to allow a number, e.g., three, simultaneous transactions to be ongoing at the same time. The system bus 12 carries transfers from the commander and resource nodes 14, 16, 18 on a "first in, first out" basis.

Thus, as shown for transaction TR_0, the data DAT_0 though DAT_3 that is associated with the command/address transfer C/A_0 in bus cycle 0 begins in cycle 11 and continues through cycle 14. For transaction TR_1, the command/address transfer C/A_1 in bus cycle 5 has cycles 16-19 as its data cycles, etc. As can be seen, two additional transactions begin between the initiation of TR_0 with the transfer of C/A_0 and the completion of TR_0 with the transfer of the associated data in DAT_0 through DAT_3.

The system bus 12 is non-pended and the sequence of cycles is fixed, i.e., the data cycles normally bear a fixed relationship with the command/address cycle and the other identified cycles on the system bus 12. Specifically, for instance, the command/address cycles occur every five bus cycles, and the data cycles DAT_0 through DAT_3 begin, e.g., on the eleventh bus cycle after the corresponding command/address cycle C/A. Following a command/address transfer, the initiator of a transaction must therefore normally wait for eleven bus cycles to send or receive data. (The system 10 preferably can also delay the fixed relationship by a variable number of cycles using a "stall" signal. In the description that follows, it is assumed that the stall signal is not asserted during the operations of the system bus 12.)

Each bus transaction is associated with two additional cycles, which occur just before the command/address cycle for the transaction, and are used to determine system bus access. These two cycles are the request REQ and arbitration ARB cycles.

Commander nodes desiring access the system bus 12 make requests for bus control by asserting the associated request lines during the REQ cycle, and the arbitration is resolved during the ARB cycle. Thus, for example, C/A_1 of cycle 5 is preceded by REQ of cycle 3 and ARB of cycle 4. The commander node that wins the arbitration transfers command/address information during the very next bus cycle.

All the nodes 14, 16, 18 on the system bus 12 monitor the requests to determine who wins the arbitration, and decode the command/address transfers to ascertain the memory banks 20a-20b being accessed. The purpose achieved by monitoring these transfers will be made clear shortly.

c. Memory Node

Figure 4B:
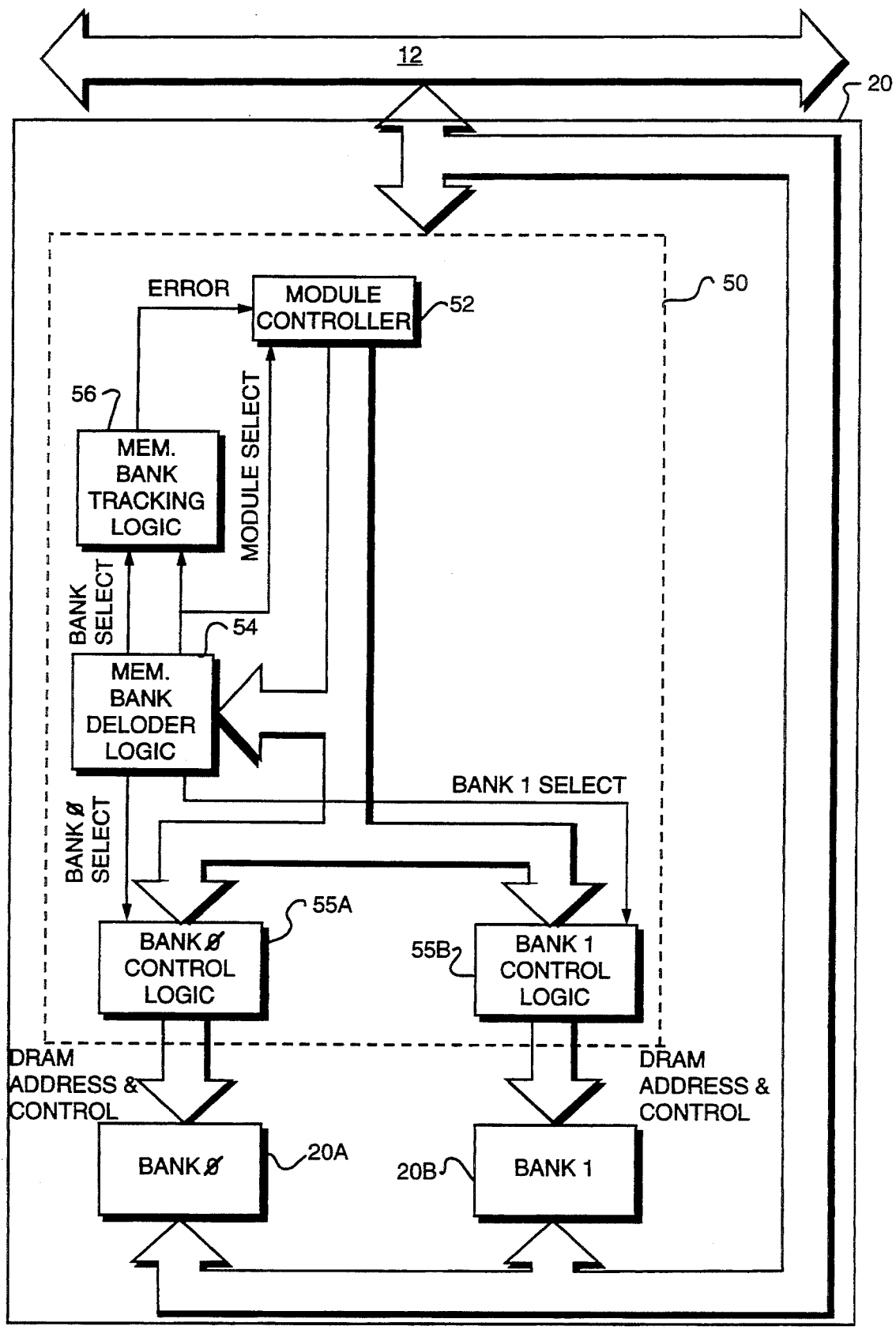
FIG. 4B is a block diagram of a preferred embodiment of one of the memory modules of FIG. 1.

FIG. 4B is a more detailed drawing of the memory module 20. The other memory modules 21, 22 illustrated in FIG. 1 can be of the same general construction as that shown for module 20, and therefore require no additional description.

Memory module 20 has a memory logic unit 50, which preferably is implemented as an application specific integrated circuit ("ASIC"), and the above-mentioned memory banks 20a, 20b. The memory banks 20a, 20b send and receive data over the system bus 12 under the control of signals generated by the memory logic unit 50. The memory banks 20a, 20b have memory bank ID's on the system bus 12 of, e.g., 0 and 1, respectively.

The memory logic unit 50 includes a module controller 52 for synchronizing transfers to and from the system bus 12, a memory bank decoder 54, which is explained in detail below, bank control logic units 55A, 55B for control (including address formatting and timing) of the operation of the respective banks 20a, 20b, and memory bank tracking logic 56. The module controller 52 passes command/address transfers received over the system bus 12 to both of the bank control logic units 55A, 55B.

The memory bank decoder 54 serves to decode the address information contained in command/address transfers received over the system bus 12 and to generate both a MODULE SELECT signal to identify whether the module 20 contains the address involved in the transfer, and a BANK SELECT signal to identify which of the banks 20a, 20b are involved, if any.

During a memory access, in response to the associated BANK SELECT signal (i.e., BANK SELECT 0 for bank No. 0 and BANK SELECT 1 for bank No. 1), the memory bank will respond to the command/address transfer, i.e., will provide the data stored at the locations addressed by the command/address transfer in the case of a read transaction, or will prepare to receive data to be written to the addressed locations in the case of a write transaction.

The memory module 20 also uses the BANK SELECT signal in implementing a restrictive memory arbitration scheme. In accordance with the invention, whenever one of the memory banks 20a, 20b, e.g., bank 20a, on the module 20 is accessed by any commander node 16, 18, the accessed bank 20a is not available for a predetermined number (e.g., two) of the following transactions on the system bus 12.

The predetermined number is selected to be at least sufficient for a first initiated transaction to be completed before a second transaction to the same memory bank is initiated. In other words, with reference to FIG. 3, the preferred implementation of the invention renders each memory bank unavailable for two transactions after an access; therefore, after the command/address transfer C/A_0, the bank involved therein is unavailable for transaction TR_1 and the transaction initiated by C/A_2. In this way, the system provides sufficient time for the data corresponding to C/A_0 to be sent over the system bus 12 prior to another transaction to that same memory bank.

Each commander node 16, 18 is responsible for tracking every memory access, and for refraining from attempting to gain system bus control for accessing memory bank 20a for the predetermined number of transactions following the prior access thereto. (A commander node 16, 18 can access the other memory bank 20b on the memory module 20, or either of the other modules 21, 22, during the predetermined number of transactions after a memory access to bank 20a, however, provided that that memory bank 20b or the other module was not also accessed during those transactions, and therefore unavailable in its own right.)

Memory module 20 also has a memory bank tracking logic 56, which determines whether any of the commander nodes 16, 18 has erroneously attempted to access the previously accessed memory bank 20a, 20b (i.e., in the given example, bank 20a) in violation of the just-described restrictive memory arbitration scheme.

More specifically, the memory bank tracking logic 56 receives the BANK SELECT signal from the memory bank decoder 54 for each transaction, which identifies whether either bank 20a or 20b is being accessed. The memory bank tracking logic 56 stores the information from the BANK SELECT signals for the predetermined number of transactions in a look-up table or using discrete latches.

For example, if bank 20a of module 20 is accessed during a transaction, the memory bank tracking logic 56 counts the following predetermined number of transactions during which time bank 20a is to be unavailable. During these counted transactions, if the BANK SELECT signal from the memory bank decoder 54 indicates that any of the commander nodes 16, 18 has attempted to access memory bank 20a, the memory bank tracking logic 56 asserts an ERROR signal, which the module controller 52 sends over the system bus 12 to all the commander nodes 16, 18.

It should be apparent from the foregoing discussion that the memory bank decoder 54 must be able to identify addresses contained within the module 20 and, indeed, within the banks 20a, 20b, in order to generate the required MODULE SELECT and BANK SELECT signals. For applications in which addressing of locations within the banks 20a, 20b is fixed, this presents no significant problem. In accordance with the invention, however, the memory resources of the computer system 10 are software configurable, i.e., both stacked and interleaved, in accordance with the above-described stacking/interleaving scheme. Accordingly, addresses specified by the command/address transfers over the system bus (called "system bus addresses") need to be decoded into physical addresses of memory locations to be accessed.

d. Address Decoder

Figure 4C:
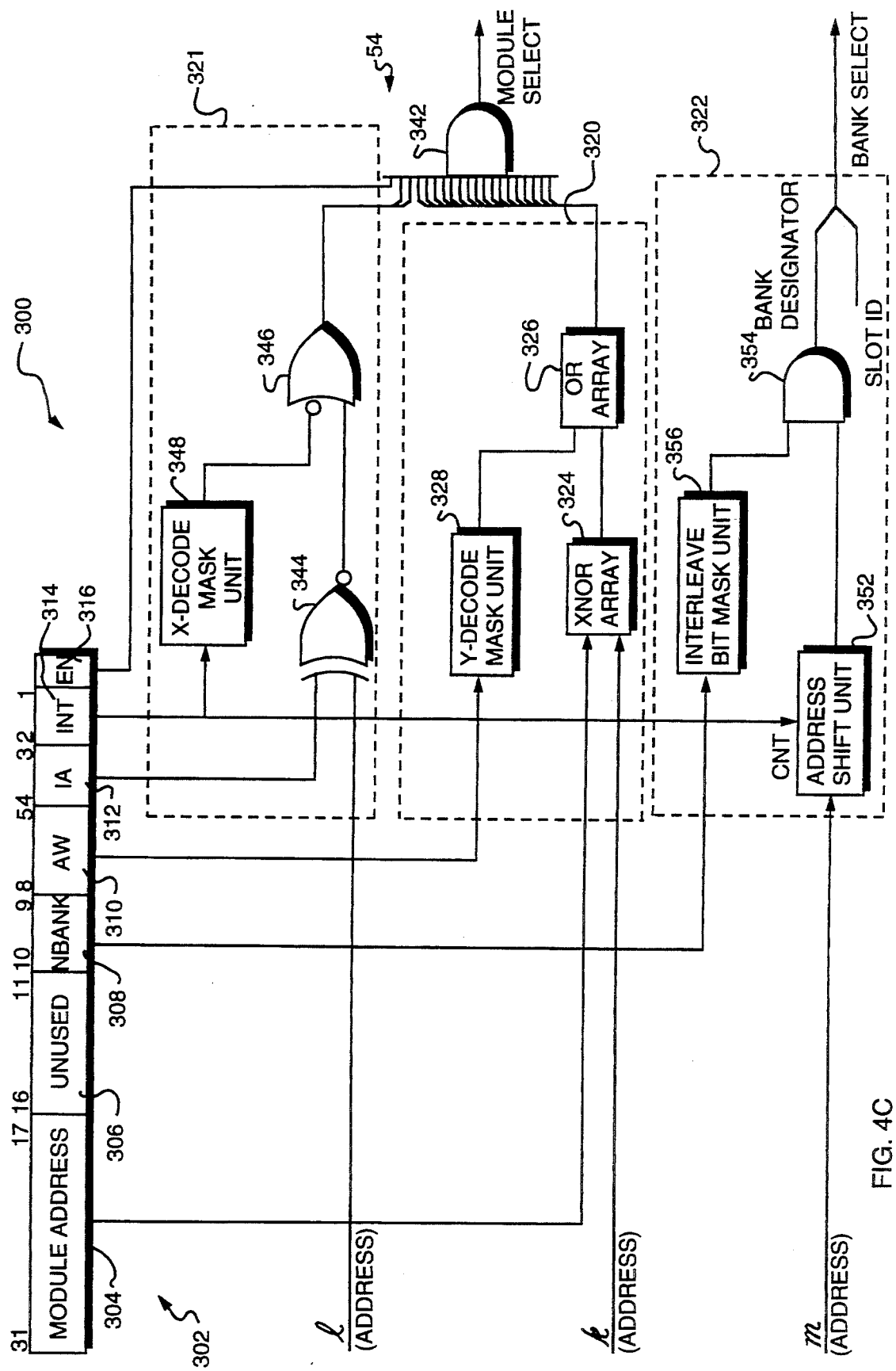
FIG. 4C is a block diagram, partially in schematic form, of a preferred embodiment for an address decoder of a type contained in each memory module and commander node of FIG. 1.

The memory bank decoder 54 has an address decoder 300, which is shown in FIG. 4C. The address decoder 300 is adapted for accommodating stacked and interleaved memory and performing the requisite address decode. The address decoder 300 has a mapping register 302, an illustrative format of which is shown in the drawing. The mapping register 302 is a 32-bit register, having the following fields:

1) A "MODULE ADDRESS" field 304 occupies bits 31:17 of the register 302, and describes the starting address of the memory module 20.
2) An "UNUSED" field 306 occupies bits 16:11, and is unused in the present system 10.
3) A "NBANK" field 308 occupies bits 10:9, and describes the number of logical banks on memory module 20, e.g., as follows:
   00-one bank
   01-two banks
   10-four banks
   11-eight banks.
   As illustrated, module 20a has two banks 20a, 20b, therefore the value of the NBANK field 308 is 01.
4) An "AW" field 310 occupies bits 8:5, and describes the address width. This field 310 is used to generate a mask field that determines the address range to which the module 20 will respond.
5) An "IA" field 312 occupies bits 4:3, and describes the starting interleave address, i.e., the number of modules interleaved together, and therefore identifies the module in the applicable interleaved memory space that should respond to the command/address transfer. For example, the IA field can have the following values:
   00-first module
   01-second module
   10-third module
   11-forth module.
6) An "INT" field 314 occupies bits 2:1, and specifies the number of modules that interleave within the interleaved memory space, e.g., as follows:
   00-one-way interleaving
   01-two-way interleaving
   10-four-way interleaved
   11-(not used).
   In the illustration of FIG. 4A, modules 20-22 are interleaved, therefore the level of interleaving is two, and value of the INT field is 01.
7) An "EN" or enable field 316 occupies bit 0, and is used to indicate that the address information is valid. For example, the enable bit is deasserted to indicate that a CPU or I/O unit (with no memory accessable via the system bus) is connected to the bus at a particular slot that could otherwise accommodate a memory module. In other words, the deasserted enable bit inhibits the decode of command/address transfers that would otherwise result in decoded memory addresses at slots on the system bus that are not being used for memory modules.

The address decoder 300 uses the data from the above-identified fields 304–316 in a three-function decoding process, for which it has an address/range decoder section (i.e., an Y-decoder) 320, an interleave decoder section (i.e., a X-decoder) 321, and a bank decoder section (i.e., a Z-decoder) 322. The decoder sections 320-322 operate concurrently, with the results combined to identify uniquely the memory bank 20a-20b on the system bus 12 corresponding to each command/address transfer received by the memory module 20 over the system bus 12. The address/range decoder section 320 determines the starting address and address range of the memory module specified by the system bus address being decoded. The interleave decoder section 321 determines the interleave address, to which the memory module 20 will respond within the address range determined by the address/range decoder section 320.

The outputs of the address/range and interleave decoder sections together form a MODULE SELECT signal, which identifies uniquely the memory module to which the command/address transfer pertains.

In the reservoir nodes, the outputs of all three decoders 320-322 are combined to form a BANK ID signal, which can serve as a BANK SELECT signal, which identifies uniquely the memory bank on the system bus 12 to which the commander/address transfer pertains. Thus, the three decoders can be considered as specifying the X, Y and Z coordinates for that particular memory bank.

More specifically, the address/range decoder section 320 has an exclusive-NOR ("XNOR") array 324, which receives a preselected first plurality (e.g., 15) of address bits designated "k" from the command/address transfer at first input terminals thereof, and the corresponding contents of the MODULE ADDRESS field 304 of the register 302 at second input terminals thereof. The XNOR array 324 makes a bit-wise (i.e., bit-by-bit) comparison of (i.e., "XNOR's") these input signals, and provides its outputs to first input terminals of an OR array 326.

The OR array 326 "OR's" the outputs of XNOR array 324 with a corresponding bit mask at second input terminals of the OR array 326, which is obtained from a Y-decode mask unit 328. If the value of a mask bit is a logical ONE, the OR array 326 passes the corresponding bit of the output from the XNOR array 324 to a corresponding input terminal of an AND gate 342, and if the bit mask value is a logical ZERO, a value of one is passed to the AND gate 342.

The bit mask values of the Y-decode mask unit 328 are generated based on the value of the AW field 310 of the mapping register 302. The following table provides the bit mask values for various values of the AW field 310:

| AW | MASK BITS |
| --- | --- |
| 0000 | 0000000000000000 |
| 0001 | 1000000000000000 |
| 0010 | 1100000000000000 |
| 0011 | 1110000000000000 |
| 0100 | 1111000000000000 |
| 0101 | 1111100000000000 |
| 0110 | 1111110000000000 |
| 0111 | 1111111000000000 |
| 1000 | 1111111100000000 |
| 1001 | 1111111110000000 |
| 1010 | 1111111111000000 |
| 1011 | 1111111111100000 |
| 1100 | 1111111111110000 |
| 1101 | 1111111111111100 |
| 1110 | 1111111111111110 |
| 1111 | 1111111111111111 |

The inputs to the AND 342 from the address/range decoder section 320 are the Y-decode bits, or the BIT-WISE MODULE ADDRESS MATCH signal. A value of logical ONE in that signal indicates that the address specified by the command/address transfer is in the address range contained in the particular module.

The interleave decoder section 321 has an exclusive-NOR array 344, which receives a preselected second plurality (e.g., 2) of address bits designated "1" from the command/address transfer at first input terminals thereof, and the corresponding contents of the IA field 312 of the register 302 at second input terminals thereof. The XNOR array 344 makes a bit-wise comparison of (i.e., "XNOR's") these input signals, and provides its outputs to first input terminals of an OR array 346.

The OR array 346 OR's, on a bit-by-bit-basis, the outputs of XNOR array 344 with a corresponding bit mask at second input terminals of the OR array 346, which is obtained from a X-decode mask unit 348. If the value of a mask bit is a logical ONE, the OR array 346 passes the corresponding bit of the output from the XNOR array 344 to a corresponding input terminal of the AND 342, and if the bit mask value is a logical ZERO, a value of logical ONE is passed to the AND 342.

The bit mask values of the X-decode mask unit 348 are generated based on the value of the INT field 3 14 of the mapping register 302. The following table provides the bit mask values for various values of the INT field 314:

| INT | MASK BITS |
| --- | --- |
| 00 | 00 |
| 01 | 10 |
| 10 | 11 |
| 11 | not used |

The inputs to the AND gate 342 from the interleave decoder stage 321 are the X-decode bits, or BIT-WISE INTERLEAVE MATCH signal. When all values of the X-decode bits are logical ONE's, the AI field 312 matches the address specified by the command/address transfer.

The values at the inputs of the AND gate 342 from the address/range and interleave decoders 320, 321 are "AND'ed" together to generate a MODULE SELECT signal that uniquely identifies the memory module to which the transfer pertains.

The bank decoder section 322 has an address shift unit 352 that receives a preselected third plurality of address bits designated "m" from the command/address transfer at a first input terminal and the contents of the INT field 314 at a CNT input terminal, and produces an output signal indicating address bits that specify, if valid, the bank to which the transfer pertains. The contents of the address shift unit 352 are, for example, as follows:

| CNT | OUTPUT |
| --- | --- |
| 00 | address bits <2:0> |
| 01 | address bits <3:1> |
| 10 | address bits <4:2> |
| 11 | not used |

An AND gate 354 receives the output signal from the address shift unit 352 at a first input terminal, and a "bank bit mask" from an interleave bit mask unit 356 at a second input terminal. The interleave bit mask unit 356 receives the contents of the NBANKS field 308, and decodes the contents of that field to produce a bank bit mask.

The AND gate 354 logical "AND's" the signals at its input terminals to produce a BANK DESIGNATOR signal. That signal is combined with a SLOT ID signal to produce a BANK SELECT signal. The SLOT ID signal indicates the identity of the physical slot on the system bus containing the memory module, and is preferably a hard-wired feature of the system 10. The BANK SELECT signal identifies the bank to which the transfer pertains, but not the memory module containing that bank.

The importance of this can be appreciated by recalling that the above-described interleaving scheme assigns addresses in alternation between the banks forming the interleaved memory space $S_I$ at the right of FIG. 4A, and that bank 20a was assigned the first of the addresses, i.e., address 0, and the other banks were assigned higher addresses. The BANK SELECT signal can indicate that the address involved in the transfer belongs to the bank that received, e.g., the first address assigned to the interleaved memory space. Thus, for transfers on the system bus involving that module, the BANK SELECT signal can identify the bank on that module involved in the transfer. That signal will not identify the particular bank on the system bus, however, because that requires additional information concerning the identity and actual implementation of the module involved.

e. I/O Interface 18

Figure 5A:
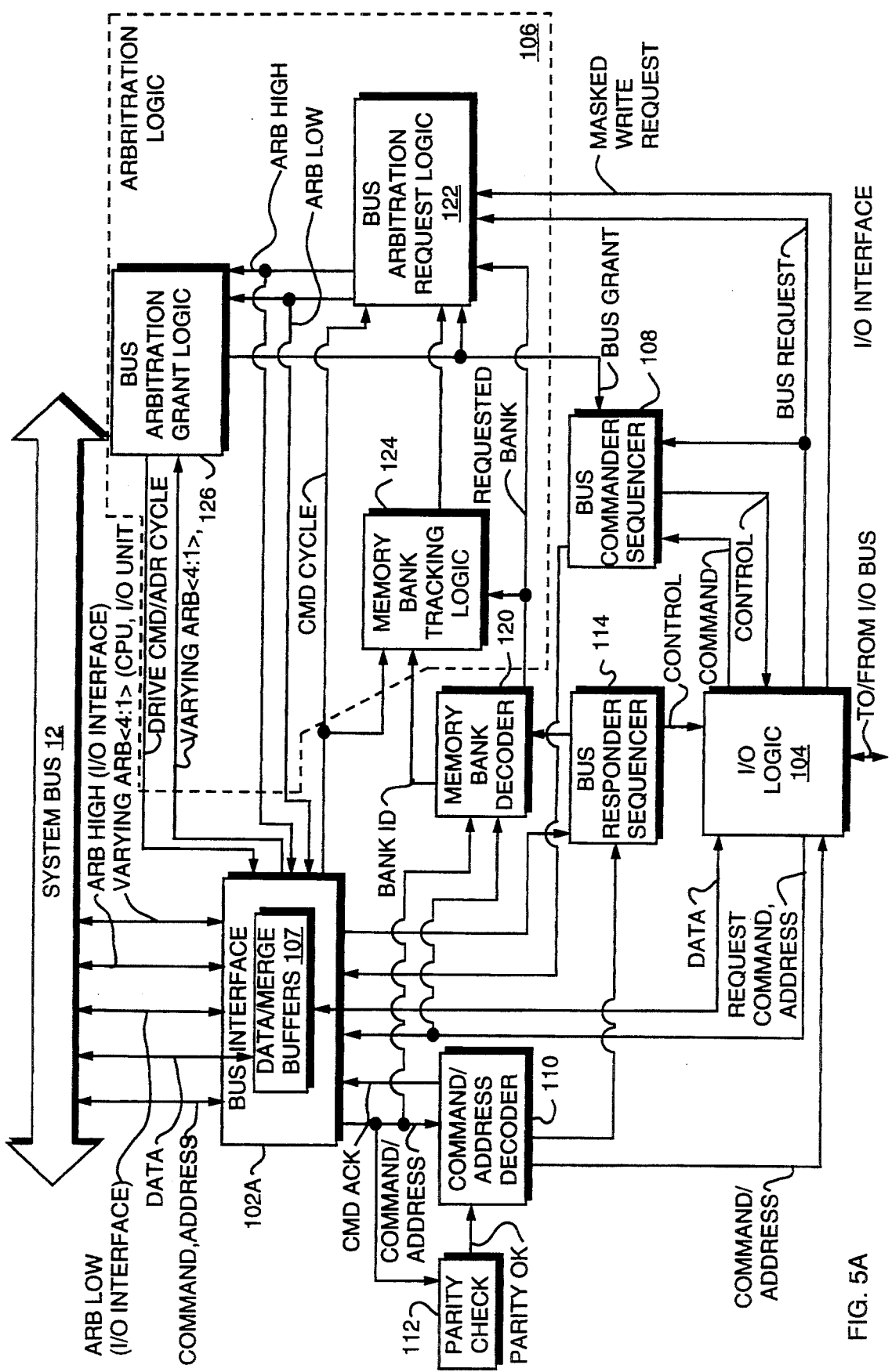
FIG. 5A is a block diagram of a preferred embodiment of the I/O interface of FIG. 1.

FIG. 5A shows the I/O interface 18 in greater detail. The I/O interface 18 has a bus interface 102 and an I/O logic unit 104, which together act as a bridge between the system and I/O buses 12, 34–37 (FIG. 1). Thus, the bus interface 102 and I/O logic unit 104 can be thought of as bus adapters, which include transceivers (not shown) for driving signals on the respective system and I/O buses 12, 34–37, and circuitry (not shown) for performing any addressing and housekeeping chores needed to carry out transfers between the respective buses 12, 34–37. The bus interface 102 also has a data/merge buffer 107 for locally storing received data.

The I/O interface 18 also has arbitration logic 106 for controlling arbitration on behalf of the I/O interface 18. The I/O logic unit 104 responds to transfers destined for resource nodes 14 on the system bus 12 by asserting BUS REQUEST signals to the arbitration logic unit 106. In response to each BUS REQUEST signal, the arbitration logic unit 106 causes the bus interface 102 to assert either ARB HIGH on REQ<5> or ARB LOW on REQ<0> of the system bus 12. The arbitration logic 106 also monitors arbitrations to determine whether the I/O interface 18 has won and therefore gained access to the system bus 12.

The I/O logic unit 104 also provides the BUS REQUEST signal to a bus commander sequencer 108. The bus commander sequencer 108 derives command/address information for the operation for which the system bus 12 is being requested from a CONTROL signal received from the I/O logic 104, and passes derived command/address information to the bus interface 102. In response to a REQUEST COMMAND/ADDRESS signal from the I/O logic 104 and the information from the bus commander sequencer 108, the bus interface 102 generates a COMMAND/ADDRESS transfer of appropriate format for the system bus 12. The bus interface 102 transmits the generated COMMAND/ADDRESS transfer over the system bus 12 only if the arbitration logic 106 indicates that the I/O interface 18 has gained control of the system bus 12 by winning an arbitration.

The bus commander sequencer 108 also sends a CONTROL signal to the I/O logic 104 for causing data received by the I/O logic 104 from the I/O units 40 to be passed over a DATA path to the bus interface 102. The received data is stored in the data/merge buffers 107 in the bus interface 102 for transmission over the system bus 12 at the appropriate bus cycles following the associated transmitted command/address transfer.

Of course, transfers can also be received over the system bus 12 by the I/O interface 18. The bus interface unit 102 provides COMMAND/ADDRESS transfers received over the system bus 12 to a command/address decoder 110 and a parity check 112. The command/address decoder 110 decodes the COMMAND/ADDRESS transfer to determine whether the destination address contained in that information matches the address of the I/O interface 18.

The parity check 112 detects errors in the command/address information by comparing the parity of the command/address information with a received parity value contained in that transfer. If the parity matches, the command/address information is regarded as valid, and the parity check 112 issues a PARITY OK signal to the command/address decoder.

In response to the PARITY OK signal, and if the destination address matches the address of the I/O interface 18, the command/address decoder 110 passes the COMMAND/ADDRESS transfer to the I/O logic 104, and sends a COMMAND ACKNOWLEDGE signal to the bus interface 102 to indicate the valid match. In response to the COMMAND ACKNOWLEDGE signal, the bus interface 102 sends the data associated with that command/address information to the I/O logic 104 over a DATA path. A bus responder sequencer 114 generates a CONTROL signal, which controls operation of the I/O logic 104 with respect to the data received over the DATA path.

The I/O interface 18 also has a memory bank decoder 120, which receives the COMMAND/ADDRESS transfer from the bus interface 102, and the REQUEST COMMAND/ADDRESS signal from the I/O logic 104, together with a timing signal from the bus responder sequences 114. The memory bank decoder 120 uses these signals to generate a BANK ID signal that identifies the memory bank 20a–20b on the system bus 12 involved in the particular transfer.

The memory bank decoder 120 of the I/O interface 18 includes a plurality of address decoders 300A–300C, each corresponding to one of the memory modules 20–22 on the system bus 12. The memory bank decoder 120 decodes addresses of command/address transfers provided by the bus interface 102 to produce BANK ID signals identifying the particular memory bank 20a–20b on the system bus 12 involved in the transfer. The memory bank decoder 120 also decodes the addresses of memory access requests received by the I/O logic 104 from I/O units 40, and provided by way of the bus responder 114 to the memory bank decoder 120, to produce REQUESTED BANK signals indicating the particular banks 20a–20b on the system bus 12 which are to be accessed.

Figure 5B:
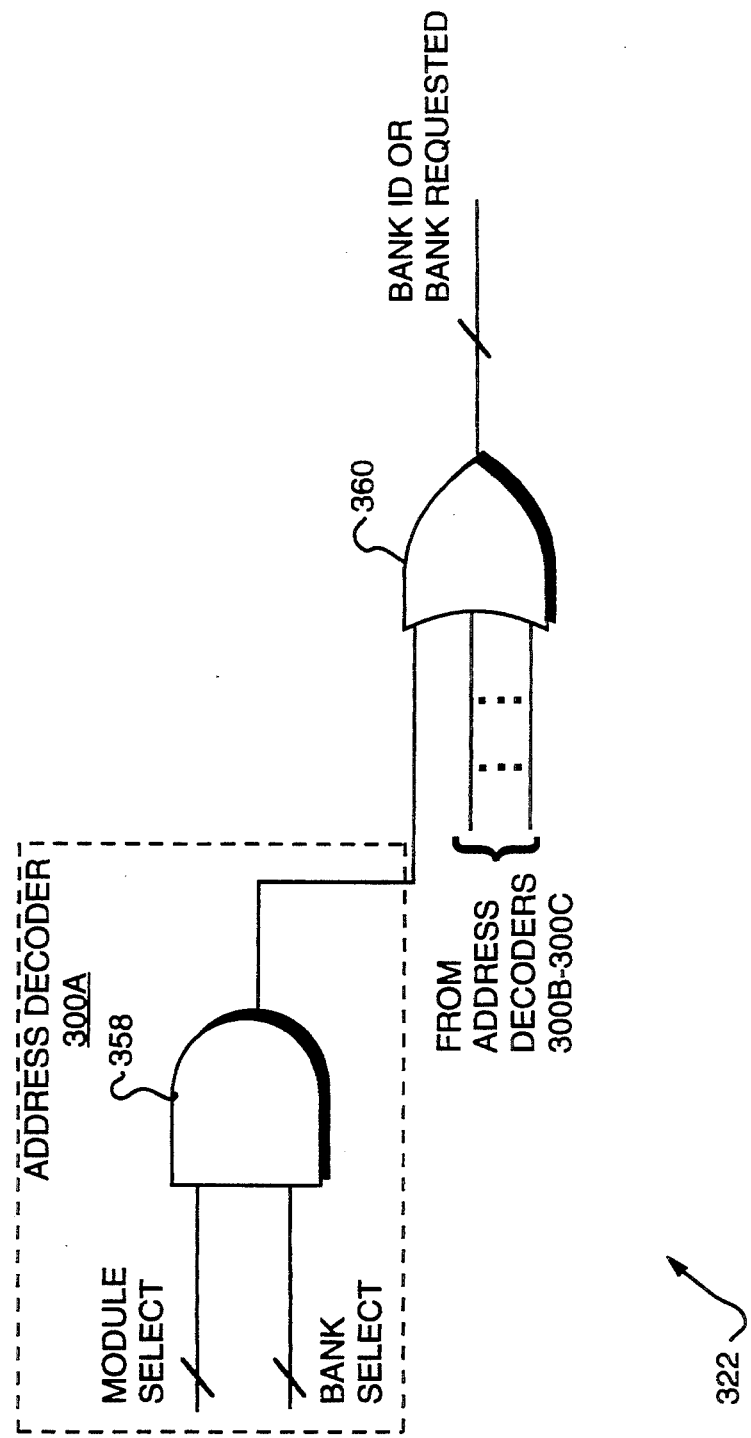
FIG. 5B is a simplified schematic diagram of a BANK-signal-generating circuit for the address decoders of the memory bank tracking logic of FIG. 5A.

Each address decoder 300A–300C is constructed the same as the decoder 300 of FIG. 4C, except with the additional circuitry of FIG. 5B for generating a BANK ID signal or BANK REQUESTED signal (depending on the address being decoded) by combining the MODULE SELECT and BANK SELECT signals for that address. The BANK-ID-generating circuit 322 of FIG. 5B combines, i.e., "AND's," the MODULE SELECT signal and the BANK SELECT signal in an AND gate 358. The output of the AND gate 358 is fed to an OR gate 360 as the output of the address decoding process of the address decoder 300A. The other input terminals of the OR gate 360 receive the outputs from AND gates (not shown) that combine the MODULE SELECT and BANK SELECT signals from the other address decoders 300B–300C. The output of the OR gate 360 is a BANK ID or BANK REQUESTED signal that specifies uniquely the bank ID of the memory bank on the system bus 12 to which the decoded address pertains.

The memory bank decoder 120 provides the BANK ID signals and the REQUESTED BANK signals to the arbitration logic unit 106. The arbitration logic unit 106 implements an improved arbitration technique, in which the I/O interface 18 can arbitrate at either of two arbitration values, as described above. The arbitration logic 106 has a bus arbitration request logic unit 122, a memory bank tracking logic unit 124, and a bus arbitration grant logic unit 126.

The bus arbitration request logic 122 responds to the BUS REQUEST signal from the I/O logic 104 by asserting either an ARB HIGH signal indicating that the I/O interface 18 should arbitrate next at the highest priority level, or an ARB LOW signal indicating that the I/O interface should arbitrate next at the lowest priority level, provided that the memory bank tracking logic 124 determines that the requested bank is available. These signals are clocked to coincide with the system bus cycles by a CMD CYCLE signal received from the bus interface 102. The selection of either the ARB HIGH or ARB LOW signals depends on the history of previous arbitrations by the I/O interface 18. This is described further in the above-identified, related application.

The information concerning the previous arbitrations is furnished by the memory bank tracking logic 124. The memory bank tracking logic unit 124 stores a database, e.g., in a look-up table or using discrete latches, which, for each memory bank 20a–20b identifies whether the bank was accessed during either of the, e.g., two most recent arbitrations.

Figure 5C:
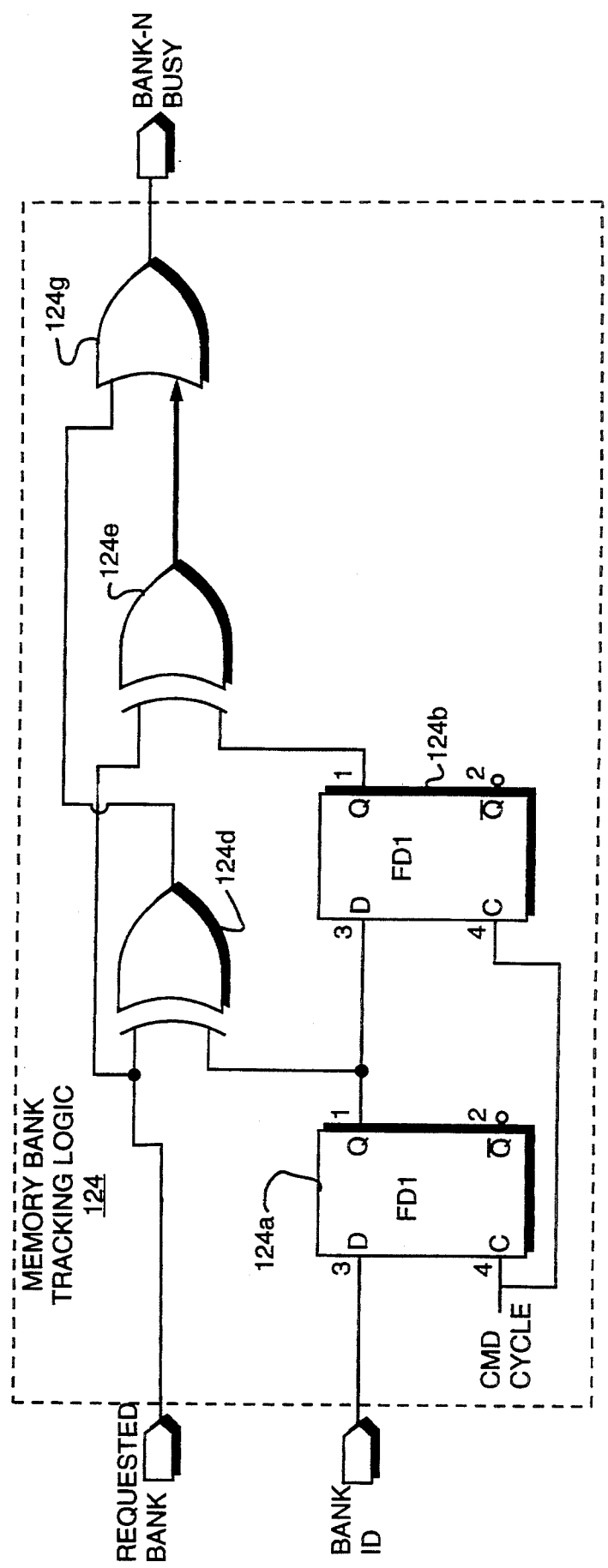
FIG. 5C is a simplified schematic diagram of an illustrative implementation of the memory bank tracking logic of FIG. 5A.

FIG. 5C shows an illustrative implementation for the memory bank tracking logic 124, having a plurality of cascaded stages, each comprising a latch 124a, 124b, and an associated exclusive-OR ("XOR") gate 124d, 124e connected to the output terminal of the latch 124a, 124b. The BANK ID signal from the memory decoder 120 is stored in latch 124a until the next-occurring command/address cycle indicated by a CMD CYCLE signal used to clock the latches 124a, 124b, and then shifted to the associated XOR 124d and consecutive stages in like manner on each subsequent "tick" of the CMD CYCLE signal.

Thus, the outputs of the associated latches 124a, 124b are applied to first input terminals of the XOR gates 124d, 124e. The decoder 120 provides the REQUESTED BANK signal for a present memory access request to the second input terminals of all the XOR 124d, 124e. The signals at the input terminals of the gates 124d, 124e are XOR'ed together. The outputs of the gates 124d, 124e are applied to an OR gate 124g, which OR's these signals, thereby producing a BANK-N BUSY signal to indicate whether the bank indicated by the REQUESTED BANK signal is unavailable.

As noted above, upon being accessed, a particular memory bank 20a–20b is unavailable for the next two request cycles. By storing the BANK ID signal, i.e., the bank ID's, for the two most recent transactions on the system bus 12, the memory bank tracking unit 124 can assure that the I/O interface 18 will not futilely attempt to arbitrate for the system bus 12 to access a memory bank 20a–20b which is unavailable. Such arbitration would only waste system resources. Thus, if the BUS REQUEST signal indicates that a particular memory bank 20a–22b is to be requested, and that memory bank was accessed during either of the two most-recent transactions, the bus arbitration request logic 122 will stall and not assert either ARB HIGH or ARB LOW until the third arbitration following that memory's access.

In response to each BUS REQUEST from the I/O logic 104, the bus arbitration request logic unit 122 of the I/O interface 118 selects either ARB HIGH or ARB LOW, or awaits memory-bank availability, depending on the BANK BUSY signal from the memory bank tracking logic unit 124. The bus arbitration request logic 122 is synchronized to the system bus cycles by the CMD CYCLE signal received from the bus interface unit 102.

The bus arbitration grant logic 126 passes the ARB HIGH and ARB LOW signals to the bus interface 102, which, in response, asserts the associated one of REQ<5> and REQ<0> in arbitrating for the system bus 12.

The bus arbitration grant logic 126 determines whether the I/O interface 18 has won the arbitration. For this, the bus arbitration grant logic 126 also receives the ARB HIGH and ARB LOW signals from the bus arbitration request logic 122 and a VARYING ARB signal from the bus interface 102 indicating whether any of the system commander nodes 16 are arbitrating for the system bus 12. Whenever the ARB HIGH signal is asserted to indicate that the I/O interface 18 is arbitrating at the highest priority level, the I/O interface 18 wins the arbitration regardless of whether any of the system commander nodes 16 are also contending for the system bus 12. Also, whenever the ARB LOW signal is asserted to indicate that the I/O interface 18 is arbitrating at the lowest priority level, but none of the system commander nodes 16 are requesting the system bus 12 and therefore the VARYING ARB signal is deasserted, the I/O interface 18 again wins the arbitration. The bus arbitration grant logic 126 asserts the BUS GRANT signal to the BUS COMMANDER SEQUENCER 108 and the bus arbitration request logic 122 to indicate that the I/O interface has won the arbitration and thus controls the system bus 12.

The above-described arbitration technique for the I/O interface 118 is further explained in the above-identified related application.

f. System Commander Nodes 16

Figure 6:
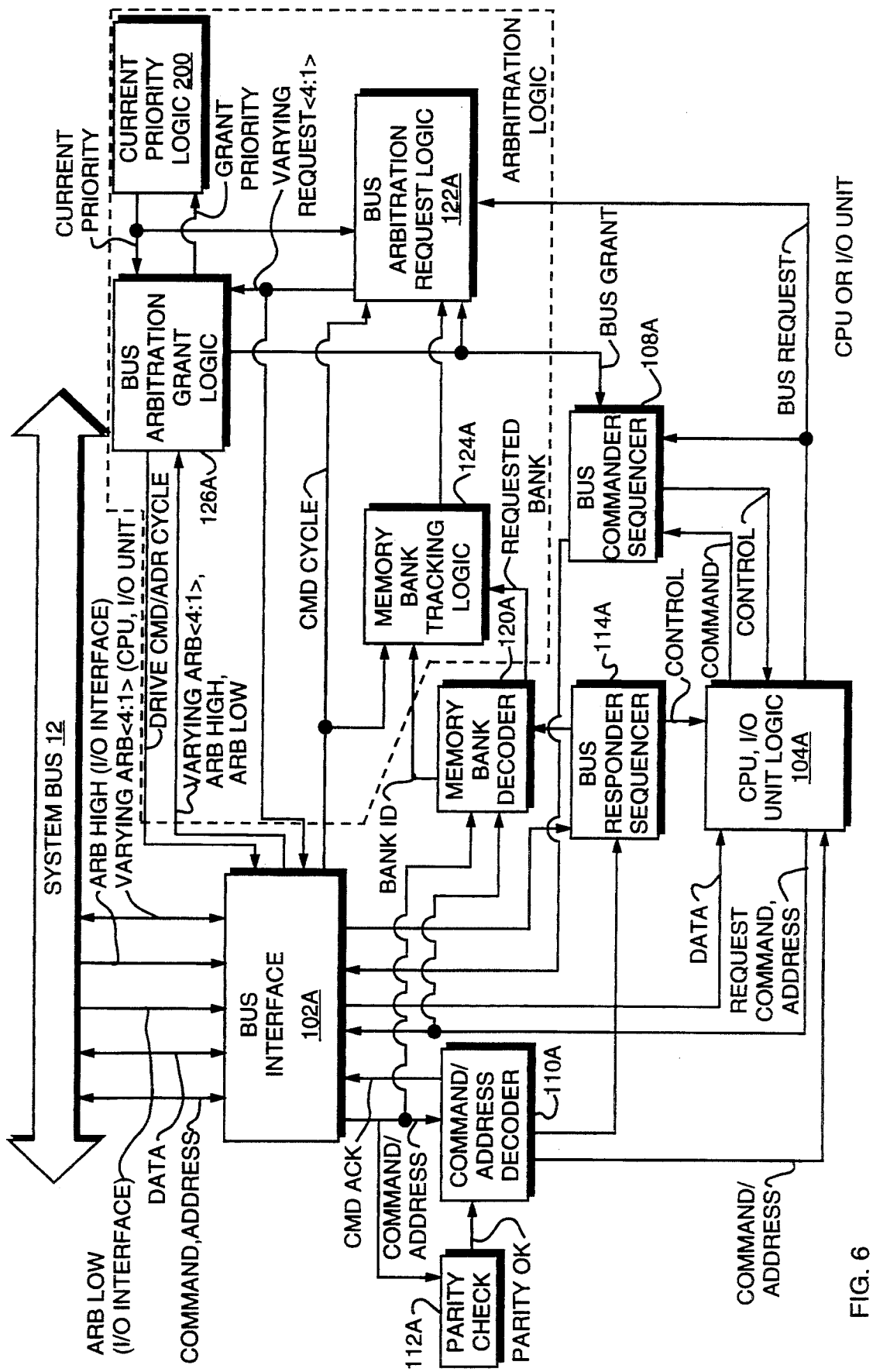
FIG. 6 is a block diagram of a preferred embodiment of one of the system commander nodes of FIG. 1.

FIG. 6 shows an illustrative embodiment of the invention as implemented for the system commander nodes 16 including the CPU's 24, 26 and the I/O interface 30. As can be seen, this figure is the same as FIG. 5A, as are the analogous components illustrated in FIGS. 5B and 5C, except for the differences shown in the figures and described below. For convenience, analogous components bear the same reference numbers, with an added suffix of "A."

In FIG. 6, the bus arbitration request logic 122A asserts one of the priority-level-representing VARYING ARB <4:1> signals in response to a BUS REQUEST signal from the I/O logic 104A of the illustrated node 16. In response, the bus interface 102A asserts the VARYING ARB conductor REQ<4:1> indicated by the VARYING ARB <4:1> signals.

The bus arbitration grant logic 126A receives and compares the priority indicated by VARYING ARB <4:1> signal with those indicated by the VARYING ARB, ARB HIGH and ARB LOW signals received from the bus interface 102A to determine whether the illustrated node 16 has won the arbitration.

The priority level represented by the VARYING ARB <4:1> signals is determined by an additional component that was not present in FIG. 5A, namely, the current priority logic 200. The current priority logic 200 tracks the priority levels of the system commander nodes 16, and varies the priority level of the illustrated node 16 indicated by the VARYING ARB <4:1> signals, e.g. in accordance with a varying priority scheme.

g. Write Operation

To illustrate, suppose one of the I/O units 40 on I/0 bus 34 desires to make a straight-forward write of 64 bytes of data to memory bank 20a. To initiate the transaction, the I/O unit 40 transmits a write request with the data over the I/O bus 34 to the I/O logic 104.

In response, the I/O logic unit 104 sends REQUEST COMMAND/ADDRESS signals to the memory bank decoder 120 and the bus interface 102. The memory bank decoder 120 uses the address-indicating portion of those signals to identify the memory bank 20a as the one into which dam is to be written. The resulting REQUESTED BANK signal for memory bank 20a is provided to the memory bank tracking logic 24, which references information stored therein to ascertain whether memory bank 20a is available. As noted above, whenever a memory bank is accessed, it is unavailable for the following two transactions on the system bus 12.

The I/O logic unit 104 also sends a BUS REQUEST signal for the transaction to the bus arbitration request logic 122. In response, the bus arbitration request logic 122 will either assert ARB HIGH or ARB LOW or will wait to assert one of these signals when the target memory bank 20a is available.

Continuing the illustrative example, if the bus arbitration request logic 122 asserts: ARB HIGH, the bus interface 102 responds by asserting conductor REQ<5> of the system bus 12. In response, since that is the highest arbitration level, the I/O interface 18 will win the arbitration and all other commander nodes 16 contending for system bus access, if there be any, will acknowledge loosing the arbitration by dropping off the system bus 12. Then, the bus arbitration grant logic will assert a BUS GRANT signal to the bus commander sequencer 108 and the bus arbitration request logic 122 to indicate that the I/O interface has control of the system bus 12. In addition, the bus arbitration grant logic 126 will assert the DRIVE CMD/ADR CYCLE signal, causing the bus interface 102 to assert the command/address conductor.

On the contrary, if the bus arbitration request logic 122 asserts ARB LOW, the bus interface 102 responds by asserting conductor REQ<0> of the system bus 12. If no other commander node 16 asserts a request on the arbitration request conductors REQ<4:1>, as indicated by the VARYING ARB <4:1> signals, the bus arbitration grant logic 126 will determine that the I/O interface 18 has won the arbitration by default and thereby gained control of the system bus 12. On the other hand, if the VARYING ARB signal indicates that another node asserted a request on REQ<4:1>, the bus arbitration grant logic 126 will determine that the I/O interface 18 has lost the arbitration and must wait until the next bus request cycle to again arbitrate.

Assuming that the I/O interface 18 has won the arbitration and controls the system bus 12, the bus interface 102 will transmit a command/address transfer during the following command/address cycle, which specifies that a write operation is to be made to memory bank 20a. Normally, eleven bus cycles later, the bus interface 102 will start transmitting the data, which it will have stored pending the data transmission. The data transfer will continue for, e.g., four, consecutive bus cycles. The system bus 12 sends, e.g., sixteen bytes per data cycle; therefore, the full 64 bytes of data to be written to memory bank 20a are transferred during these four cycles.

As described above, each commander node 16, 18 monitors memory bank access, and will not attempt to access memory bank 20a for the next two command/address cycles following the just-described write transaction.

The illustrated system 10 is shown for illustrative purposes. Indeed, generalizing, computer systems practicing the invention can be configured with other numbers and types of nodes. Accordingly, the system can have "N" CPU's, and "M" memory modules, each with a number of memory banks, connected to the system bus 12, where "N" and "M" can be any positive integers. The system also can have "U" I/O units connected to the system bus 12 directly or "V" connected via the I/O bus 34–37, where "U" and "V" are positive integers. In the illustrated embodiment, "N+U=4" system commander nodes 16. Other embodiments could have, e.g., "N+U=8" system commander nodes.

The foregoing description has been limited to a specific embodiment of this invention. It will be apparent, however, that variations and modifications may be made to the embodiment, with the attainment of some or all of the advantages of the invention. Therefore, it is the object of the appended claims to cover all such variations and modifications as come within the true spirit and scope of the invention.

What is claimed is:

1. In a data processing system having a plurality of commander nodes and a plurality of memory banks interconnected by a system bus; said commander nodes gaining control of said system bus by arbitration therefore during request cycles associated therewith and, after gaining control of the system bus, sending address transfers thereover; said address transfers representing address information corresponding to a plurality of memory locations in particular ones of the memory banks to which said commander nodes desire access; a memory management and arbitration method for minimizing system bus contention by minimizing memory bank conflicts comprises the steps of:

A) each commander node desiring access to a particular one of said memory banks determining whether said particular one of said memory banks is available for access before initiating an arbitration for said system bus, said availability determining step including the following steps performed by each commander node
    i) monitoring the system bus,
    ii) decoding address transfers received over the system bus to produce a plurality of decoded memory bank identifying signals identifying the memory banks that contain the memory locations represented by the address transfers,
    iii) storing the decoded memory bank identifying signals for the memory banks involved in a predetermined number of prior address transfers, and
    iv) comparing the stored memory bank identifying signals with a memory bank identifying signal associated with said particular one of said memory banks, and
    v) if said compared memory bank identifying signals are not the same, determining that said particular one of said memory banks is available for access; and
  B) after determining that said particular one of said memory banks is available for access, each commander node transmitting a request for system bus control.

2. The memory management and arbitration method in accordance with claim 1, further comprising the step of interleaving the addresses of memory locations in said memory banks before said availability determining step.

3. The memory management and arbitration method in accordance with claim 1, wherein said decoding step includes the steps of A) each commander node storing information in mapping register means concerning the addresses assigned to, and the structure of, said memory banks;

B) each commander node decoding in an address-/range decoder said address transfers to determine information specifying starting addresses and ranges of addresses to which the address transfers pertain, decoding in an interleave decoder the address transfers to determine information specifying interleaved addresses within a corresponding one of address ranges to which the address transfers pertain, decoding in a bank decoder the address transfers to determine information specifying the bank to which the address transfers pertain; and C) each commander node combining the information from said decoding step (B) to produce memory bank identifying signals for identifying the memory banks represented by the address transfers.

4. The memory management and arbitration method in accordance with claim 3, further comprising the step of interleaving the addresses of memory locations in said memory banks before said availability determining step.

5. The memory management and arbitration method in accordance with claim 1, further comprising the steps of A) providing a plurality of memory modules, each memory module including a plurality of the memory banks, and B) each memory module decoding address transfers received over the system bus to derive a signal indicating whether the memory banks included in each memory module contain the memory locations represented by the address transfers.

6. A data processing system having a plurality of commander nodes and a plurality of memory banks interconnected for communication by a system bus; said commander nodes gaining control of said system bus by arbitrating therefor during request cycles and, after gaining control of the system bus, sending address transfers thereover; said address transfers representing address information corresponding to memory locations in particular ones of the memory banks to which said commander nodes desire access; an apparatus in each commander node for determining whether each memory bank is available for access, said apparatus comprising:

A) means for decoding address transfers received over the system bus to produce decoded memory bank ID's identifying the memory banks on the system bus that contain the memory locations represented by the address transfers, B) means for storing the decoded memory bank ID's for the memory banks involved in a predetermined number of prior address transfers, and C) means for comparing the stored memory bank ID's with a memory bank ID associated with each memory bank for which access is to be had, and determining, if said compared memory bank ID's are not the same, that a memory bank is available for access; and D) means, disposed in each of said commander nodes, for requesting access to said system bus when said means for comparing determines that a memory bank is available for access.

7. A data processing system comprising:

A) a plurality of commander nodes,

B) at least one memory module including a plurality of memory banks,

C) a system bus for interconnecting said commander nodes and said memory banks for communication therebetween, D) said commander nodes gaining control of said system bus by arbitrating therefore during request cycles associated therewith, and, after gaining control of the system bus, sending address transfers thereover;

E) each address transfer representing address information corresponding to memory locations in a particular one of the memory banks, said address information including a starting address, an address range, and an interleave address within a corresponding address range, and F) address decoder means disposed in each commander node and said at least one memory module, comprising i) an address/range decoder for decoding said address transfers to derive information specifying starting addresses and ranges of addresses to which the address transfers pertain, ii) an interleave decoder for decoding the address transfers to derive information specifying interleaved addresses within a corresponding one of address ranges to which the address transfers pertain, and iii) a bank decoder for decoding the address transfers to derive information specifying the memory banks to which the address transfers pertain.

8. The data processing system in accordance with claim 7, wherein the information derived by said address/range decoder and said interleave decoder specifies a particular one of said at least one memory module to which the adddress transfers pertain, and the information derived by said bank decoder specifies the memory banks, but not said particular one of said at least one memory module, to which the address transfers pertain, and said system further includes means for combining the information derived by the address/range, interleave and bank decoders to specify said particular one of said at least one memory module and a particular one of said memory banks to which the address transfers pertain.

* * * * *